(12) United States Patent
Park

(10) Patent No.: US 9,260,144 B2
(45) Date of Patent: Feb. 16, 2016

(54) LOWER TRACK OF CRAWLER EXCAVATOR

(75) Inventor: Kyung-Hyun Park, Changwon-si (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 104 days.

(21) Appl. No.: 14/350,482

(22) PCT Filed: Oct. 12, 2011

(86) PCT No.: PCT/KR2011/007570
§ 371 (c)(1),
(2), (4) Date: Apr. 8, 2014

(87) PCT Pub. No.: WO2013/054956
PCT Pub. Date: Apr. 18, 2013

(65) Prior Publication Data
US 2014/0246899 A1  Sep. 4, 2014

(51) Int. Cl.
*B62D 55/28* (2006.01)
*B62D 55/20* (2006.01)
*B62D 55/275* (2006.01)

(52) U.S. Cl.
CPC .............. *B62D 55/20* (2013.01); *B62D 55/275* (2013.01); *B62D 55/28* (2013.01)

(58) Field of Classification Search
CPC ...... B62D 55/20; B62D 55/26; B62D 55/275; B62D 55/28; B62D 55/283; B62D 55/286
See application file for complete search history.

(56) References Cited

U.S. PATENT DOCUMENTS 3,231,316 A * 1/1966 Ruf .......................... A24F 19/00
305/162

3,584,922 A * 6/1971 Koerner ............... B62D 55/211
156/173

(Continued)

FOREIGN PATENT DOCUMENTS

CN  1166814 A  12/1997
JP  08-002456 A  1/1996

(Continued)

OTHER PUBLICATIONS

International Search Report (in Korean and English) and Written Opinion (in Korean) for PCT/KR2011/007570, mailed Jul. 30, 2012; ISA/KR.

(Continued)

*Primary Examiner* — Brodie Follman
(74) *Attorney, Agent, or Firm* — Harness, Dickey & Pierce, P.L.C.

(57) ABSTRACT

Disclosed is a lower track for mounting rubber pads on a track shoe to be attachable and detachable after assembling a steel plate which is adhered with divisionally formed rubber pads as a single unit without additionally perforating coupling through-holes in the track shoe when the rubber pad which forms the lower track and the track shoe which is formed of a metal material are coupled. The lower track of a crawler excavator according to the present invention comprises: first and second rubber pads which are divisionally formed; a first steel plate which supports the bottom surface of the first rubber pad by surrounding the same, and has first hooks formed on the bottom surface thereof and coupling holes formed in a connection stepped-portion, which is formed at the opposite side of the first hooks; a second steel plate which supports the bottom surface of the second rubber pad by surrounding the same, and has second hooks formed on the bottom surface thereof, connection protrusions formed at the opposite side of the second hooks so as to be secured on the connection stepped-portion, and connection through-holes formed in the protrusions so as to correspond to the coupling holes; and coupling members sequentially passing through the through-holes formed in the second rubber pad and the through-holes formed in the second steel plate so as to be fixed in the coupling holes of the first steel plate.

3 Claims, 4 Drawing Sheets

(56) References Cited

U.S. PATENT DOCUMENTS

| | | | | |
|---|---|---|---|---|
| 3,642,332 | A * | 2/1972 | Sinclair | B62D 55/275 305/162 |
| 3,897,980 | A * | 8/1975 | Dester | B62D 55/096 305/197 |
| 3,944,296 | A * | 3/1976 | Stampone | B62D 55/28 264/273 |
| 4,461,516 | A * | 7/1984 | Lee | B62D 55/28 305/161 |
| 4,588,233 | A * | 5/1986 | DenBesten | B62D 55/275 305/51 |
| 5,769,511 | A * | 6/1998 | Hattori | B62D 55/275 305/189 |
| RE36,025 | E * | 1/1999 | Suzuki | B62D 55/275 305/187 |
| 6,299,265 | B1 * | 10/2001 | Hoffart | B62D 55/28 152/225 R |
| 6,557,954 | B1 * | 5/2003 | Hattori | B62D 55/275 305/187 |
| 6,820,948 | B2 * | 11/2004 | Katoh | B62D 55/26 305/188 |
| D588,170 | S * | 3/2009 | Kumano | D15/28 |
| 7,673,951 | B2 * | 3/2010 | Chiang | B62D 55/275 305/162 |
| 7,901,015 | B1 * | 3/2011 | Anderson | B62D 55/28 152/225 C |
| 7,901,016 | B2 * | 3/2011 | Burrowes | B62D 55/08 305/189 |
| 2014/0246899 | A1 * | 9/2014 | Park | B62D 55/28 305/189 |

FOREIGN PATENT DOCUMENTS

| | | |
|---|---|---|
| JP | 08002456 A | 1/1996 |
| JP | 08011757 A | 1/1996 |
| JP | 08-127370 A | 5/1996 |
| JP | 09303337 A | 11/1997 |
| JP | 10-194172 A | 7/1998 |
| JP | 11-049050 A | 2/1999 |

OTHER PUBLICATIONS

Notification of First Office Action from State Intellectual Property Office (SIPO) of People's Republic of China issued Sep. 1, 2015 for Application No. 201180074097.5 (with English translation) (12 pages).

* cited by examiner

LOWER TRACK OF CRAWLER EXCAVATOR

FIELD OF THE INVENTION

The present invention relates to a track shoe of a crawler type excavator. More particularly, the present invention relates to a lower track of a crawler type excavator, in which in the case where a pair of rubber pads and a track shoe made of a metal material, which constitute a lower track of the crawler type excavator, are coupled to each other, a pair of steel plates to which the rubber pads dividedly formed are joined can be assembled into a single unit, and then the rubber pads can be detachably mounted on the track shoe without having a separate fastening through-hole drilled on the track shoe.

BACKGROUND OF THE INVENTION

A lower track of a general crawler type excavator shown in FIG. 1 includes:
- a plurality of track shoes 1 each configured to form a ground plane of a crawler to allow an orbital motion of the track shoes to be performed by a drive wheel (i.e., referring to a sprocket) connected to a travel motor (not shown);
- a pair of opposed track links 3 and 4 each mounted on the track shoe 1 by means of a bolt or the like and including a plurality of link segments consecutively connected to each other by a plurality of track pins to allow the orbital motion of the track shoes to be performed by the drive wheel;
- a plurality of bushings 5 engaged into associated ones of engagement holes 3a and 4a formed to confront each other in the track links 3 and 4 in such a manner that the bushings are spaced apart from each other at equal distances, and configured to surroundingly support the track pins 2.

Since such a crawler type excavator causes damage to an asphalt or concrete surface when it travels on the asphalt or concrete surface, a rubber pad is mounted on a track shoe by a bolt or the like to prevent damage of a road surface due to its travel.

A means for mounting a rubber pad to a track shoe of a crawler type excavator in accordance with the prior art as shown in FIG. 2(a) includes a plurality of fastening members 7 (for example, four bolts are used) protrudingly formed on the underside of the rubber pad 6, a plurality of fastening holes 1a penetratingly formed on the track shoe 1 to correspond to the fastening members 7, and a plurality of fastening nut 8 fastened to the fastening members 7 engaged into the fastening holes 1a.

As described above, the lower track of the conventional crawler type excavator in accordance with one embodiment of the prior art entails a problem in that the fastening holes 1a are required to be separately drilled on the track shoe 1 in order to mount the rubber pad 6 to the track shoe 1, leading to an increase in the manufacturing cost and a degradation of the strength of the track shoe 1 due to the drilled fastening holes 1a.

A means for mounting a rubber pad to a track shoe of a crawler type excavator in accordance with the prior art as shown in FIG. 2(b) includes a pair of hooks 9 formed on one side of the underside of a rubber pad 6 so as to allow a track shoe 1 to be fixedly seated thereon, and a pair of fastening members 10 (for example, two bolts are used) engaged into screw holes (not shown) formed on the other side of the underside of the rubber pad 6 via through-holes 1a formed on one side of the track shoe 1 seated on the hooks 9.

As described above, the lower track of the conventional crawler type excavator in accordance with one embodiment of the prior art entails a problem in that the fastening holes 1a are required to be separately drilled on the track shoe 1 in order to mount the rubber pad 6 to the track shoe 1, leading to an increase in the manufacturing cost and a degradation of the strength of the track shoe 1 due to the drilled fastening holes 1a.

A means for mounting a rubber pad to a track shoe of a crawler type excavator in accordance with the prior art as shown in FIG. 2(c) includes a pair of hooks 9 formed on one side of the underside of a rubber pad 6 so as to allow a track shoe 1 to be fixedly seated thereon, a bottom plate hook 11 mounted on one side of the rubber pad 6 so as to support the other side of the track shoe supported at one side thereof by the hooks 9, and a pair of fastening members 10 engaged into screw holes 6a formed on a side of the rubber pad 6 via through-holes 1a formed on the bottom plate hook 11.

As described above, the lower track of the conventional crawler type excavator in accordance with one embodiment of the prior art entails a problem in that the heads of the fastening members 10 are protrudingly exposed to the outside in order to mount the rubber pad 6 to the track shoe 1, the fastening members 10 may be damaged due to a shock applied thereto from the outside, leading to an escape of the rubber pad 6 from the track shoe 1.

DETAILED DESCRIPTION OF THE INVENTION

Technical Problems

Accordingly, the present invention has been made to solve the aforementioned problem occurring in the prior art, and it is an object of the present invention to provide a lower track of a crawler type excavator, in which in the case where a rubber pad is coupled to a track shoe made of a metal material, which constitutes the lower track, a separate fastening through-hole is not required to be drilled on the track shoe, thereby reducing the manufacturing cost and preventing a degradation of the strength of the track shoe 1.

Another object of the present invention is to provide a lower track of a crawler type excavator, in which a pair of steel plates to which a pair of rubber pads dividedly formed are joined are assembled into a single unit, and then the rubber pads are be detachably mounted on the track shoe, thereby improving workability of assembly, and the fastening members by which the rubber pad coupled to the track shoe are prevented from being exposed to the outside, thereby avoiding damage of the fastening members due to an external impact.

Technical Solution

To accomplish the above object, in accordance with an embodiment of the present invention, there is provided a lower track of a crawler type excavator, including:
- a pair of first and second rubber pads which are dividedly formed;
- a first steel plate configured to surroundingly support the underside of the first rubber pad, the first steel plate having one or more first hooks formed on the underside thereof so as to allow one end of a track shoe to be supportingly seated thereon, and a joint stepped portion having one or more fastening holes formed thereon, the joint stepped portion being formed on an opposite side of the first hook;

a second steel plate configured to surroundingly support the underside of the second rubber pad, the second steel plate having one or more second hooks formed on the underside thereof so as to allow the other end of the track shoe to be supportingly seated thereon, and a joint projection portion having one or more through-holes formed thereon to correspond to the fastening holes, the joint projection portion being formed on an opposite side of the second hook so as to be seated on the joint stepped portion; and one or more fastening members fixedly engaged into the fastening holes of the first steel plate after passing through one or more through-holes formed in the second rubber pad and the through-holes of the second steel plate in this order, wherein the track shoe is supported by hooking the first and second hooks on both ends of the track shoe, the first and second steel plates are assembled into a single unit by superimposing the joint projection portion of the second steel plate on the corresponding joint stepped portion of the first steel plate, and the first and second rubber pads having the undersides on which the first and second steel plates are supported are detachably mounted on the track shoe by the fastening members fixedly engaged into the fastening holes of the first steel plate after passing through the through-holes of the second rubber pad and the through-holes of the second steel plate.

In accordance with a preferred embodiment of the present invention, the through-holes and the fastening holes are formed on the second rubber pad, and the joint stepped portion and the joint projection portion of the first and second steel plates, so that the first and the second rubber pads are mounted on the track shoe by bolts passing through the through-holes of the second rubber pad and the fastening holes and the through-holes of the first and second steel plates and nuts fastened to the bolts and positioned in mud holes of the track shoe.

In addition, the through-holes are formed on the second rubber pad, and the joint stepped portion and the joint projection portion of the first and second steel plates, and one or more fixing plates are provided which are fixed by welding to the underside of one or more through-holes of the joint stepped portion, have one or more fastening holes formed thereon to coincide with the through-holes, and are positioned in mod holes of the track shoe, so that the first and second rubber pads are mounted on the track shoe by bolts which are fixedly engaged into the fastening holes of the fixing plates after passing through the through-holes of the second rubber pad and the through-holes of the first and second steel plates.

Advantageous Effect

The lower track of a crawler type excavator in accordance with an embodiment of the present invention as constructed above has the following advantages.

In the case where a rubber pad is coupled to a track shoe made of a metal material, which constitutes the lower track, a separate fastening through-hole is not required to be drilled on the track shoe, thereby reducing the manufacturing cost and preventing a degradation of the strength of the track shoe and thus ensuring reliability.

In addition, the steel plates to which the rubber pads dividedly formed are joined are assembled into a single unit, and then the rubber pads are be detachably mounted on the track shoe, thereby improving workability of assembly. Further, when the rubber pads are damaged during the work, only a relevant rubber pad can be replaced with new one, thereby enhancing the economic efficiency, and the fastening members by which the rubber pad is coupled to the track shoe are prevented from being exposed to the outside, thereby avoiding damage of the fastening members due to an external impact.

BRIEF DESCRIPTION OF THE DRAWINGS

The above objects, other features and advantages of the present invention will become more apparent by describing the preferred embodiments thereof with reference to the accompanying drawings, in which.

EXPLANATION ON REFERENCE NUMERALS OF MAIN ELEMENTS IN THE DRAWINGS

Figure 1:
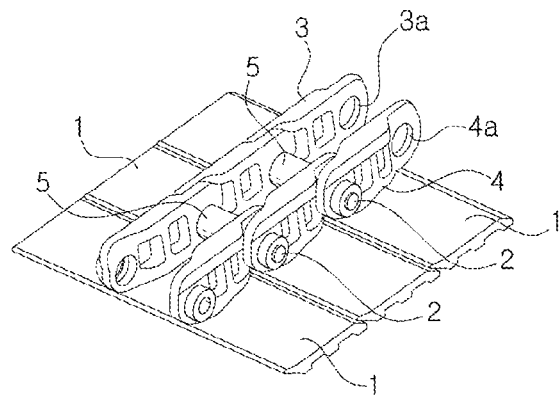
FIG. 1 is an enlarged perspective view showing the main elements of a crawler of a general crawler type excavator.
Figure 2A:
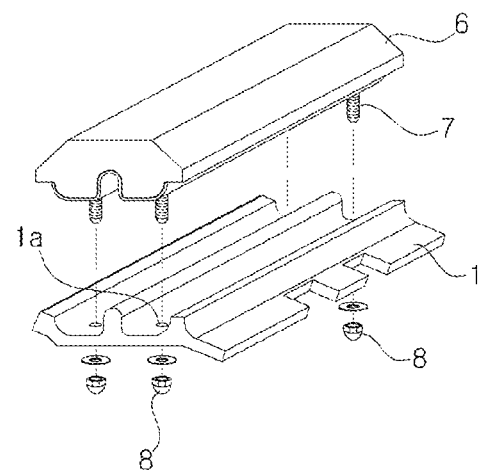
FIGS. 2(a) to 2(c) are schematic exploded perspective views showing a lower track of a crawler type excavator in accordance with the prior art.
Figure 2B:
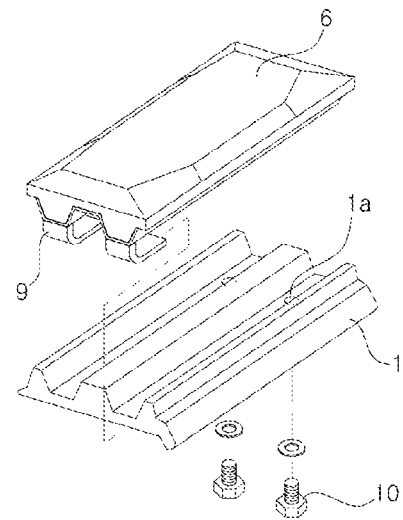
Figure 2C:
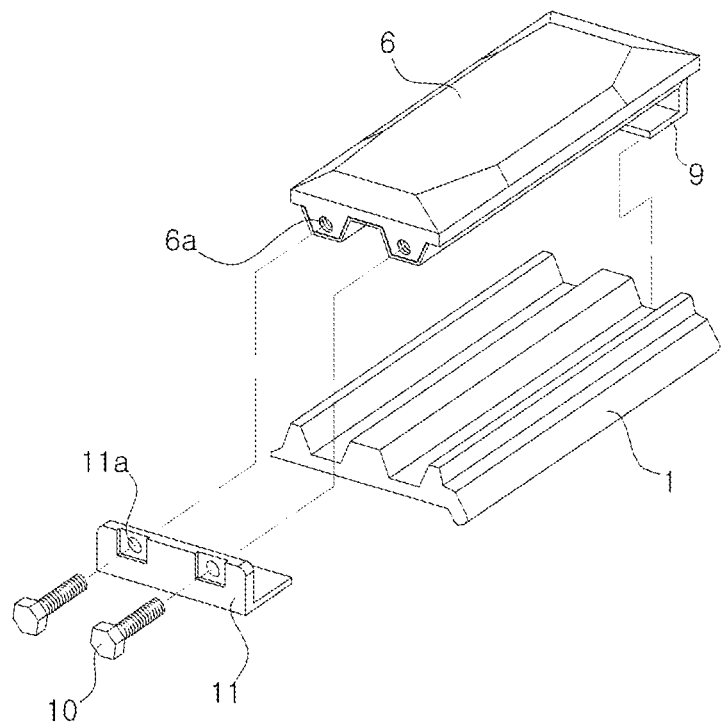

50: first rubber pad
51: second rubber pad
50a: first steel plate
51a: second steel plate
50b: first hook
51b: second hook
52: fastening member
53: through-hole
54: fastening hole
55: track shoe
56: mud hole
57: through-hole

PREFERRED EMBODIMENTS OF THE INVENTION

Now, preferred embodiments of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

Hereinafter, a preferred embodiment of the present invention will be described in detail with reference to the accompanying drawings.

Figure 3:
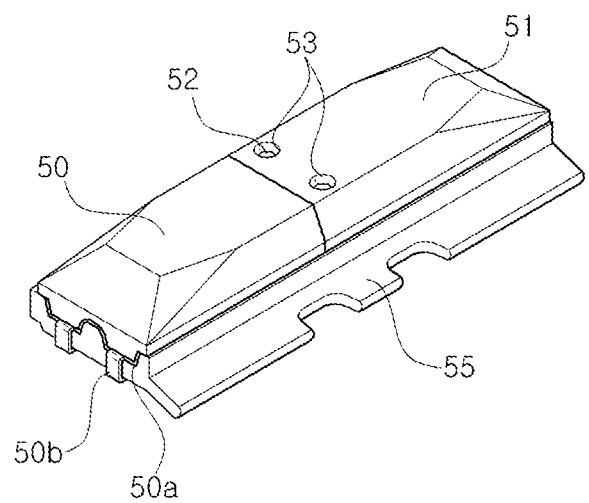
FIG. 3 is an assembled perspective view showing a lower track of a crawler type excavator in accordance with an embodiment of the present invention.
Figure 4:
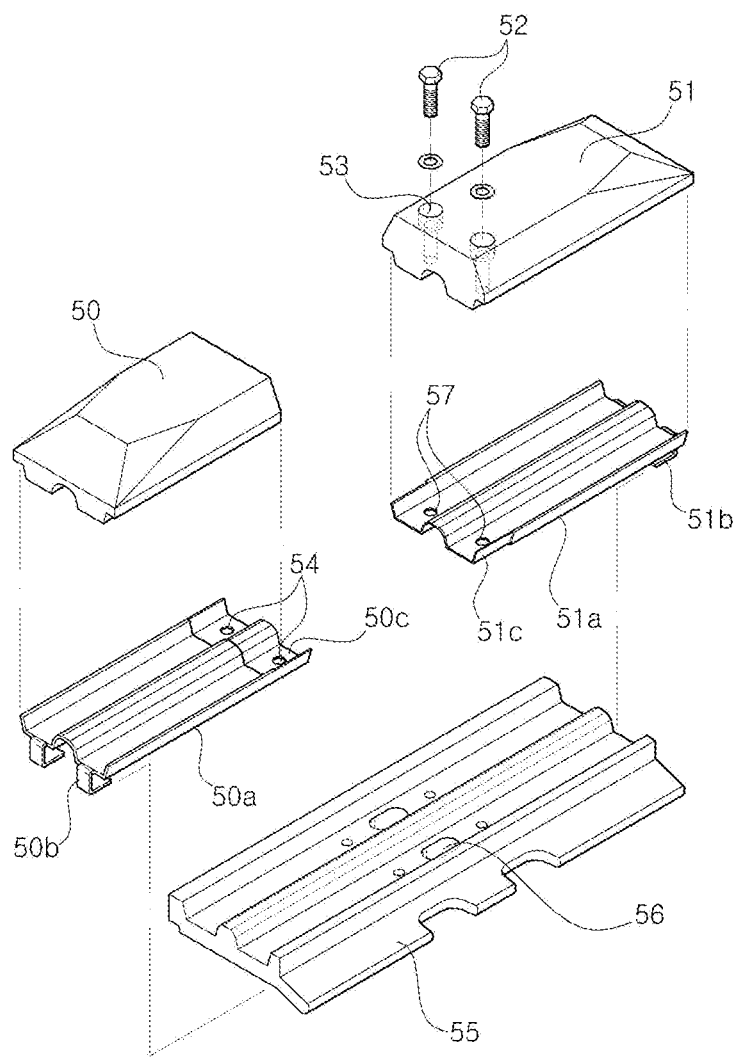
FIG. 4 is an exploded perspective view showing a lower track of a crawler type excavator in accordance with an embodiment of the present invention.

A lower track of a crawler type excavator in accordance with an embodiment of the present invention as shown in FIGS. 3 and 4 includes:

a pair of first and second rubber pads 50 and 51 which are dividedly formed;

a first steel plate 50a which is configured to surroundingly support the underside of the first rubber pad 50, the first steel plate having a pair of first hook 50b formed on the underside thereof so as to allow one end of a track shoe 55 to be supportingly seated thereon, and a joint stepped portion 50c having one or more fastening holes 54 formed thereon, the joint stepped portion being formed on an opposite side of the first hook 50b;

a second steel plate 51a which is configured to surroundingly support the underside of the second rubber pad 53, the second steel plate having one or more second hooks 51b formed on the underside thereof so as to allow the other end of the track shoe 55 to be supportingly seated thereon, and a joint projection portion 51c having one or more through-holes 57 formed thereon to correspond to the fastening holes 54, the joint projection portion being formed on an opposite side of the second hook 51b so as to be seated on the joint stepped portion 50c; and one or more fastening members 52 which are fixedly engaged into the fastening holes 54 of the first steel plate 50a after passing through one or more through-holes 53 formed in the second rubber pad 51 and the through-holes 57 of the second steel plate 51a in this order, wherein the track shoe 55 is supported by hooking the first and second hooks 50b and 51b on both ends of the track shoe 55, the first and second steel plates 50a and 51a are assembled into a single unit by superimposing the joint projection portion 51c of the second steel plate 51a on the corresponding joint stepped portion 50c of the first steel plate 50a, and the first and second rubber pads 50 and 51 having the undersides on which the first and second steel plates 50a and 51a are supported are detachably mounted on the track shoe 55 by the fastening members 52 fixedly engaged into the fastening holes 54 of the first steel plate 50a after passing through the through-holes 53 of the second rubber pad 51 and the through-holes 57 of the second steel plate 51a.

The through-holes 53 are formed on the second rubber pad 51, and the fastening holes 54 and the through-holes 57 are formed on the joint stepped portion 50c and the joint projection portion 51c of the first and second steel plates 50a and 51a, so that the first and the second rubber pads 50 and 51 can be mounted on the track shoe 55 by bolts 52 passing through the through-holes 53 of the second rubber pad 51 and the fastening holes 54 and the through-holes 57 of the first and second steel plates 50a and 51a and nuts fastened to the bolts 52 and positioned in mud holes 56 of the track shoe 55.

Hereinafter, a use example of the lower track of a crawler type excavator in accordance with an embodiment of the present invention will be described in detail with reference to the accompanying drawings.

As shown in FIGS. 3 and 4, the first and second hooks 50b and 51b formed to be opposed to each other on the first and second steel plates 50a and 51a disposed on the undersides of the first and second rubber pads 50 and 51 are hooked on both ends of the track shoe 55 to support the track shoe 55.

The first and second steel plates 50a and 51a can be assembled into a single unit by superimposing the joint projection portion 51c of the second steel plate 51a on the corresponding joint stepped portion 50c of the first steel plate 50a. At this time, the through-holes 53 of the second rubber pad 51, the through-holes 57 of the joint projection portion 51c of the second steel plate 51a, and the fastening holes 54 of the joint stepped portion 50c of the first steel plate 50a are positioned on the same line.

Thus, the track shoe 55 is supported in a state in which the first and second hooks 50b and 51b are hooked on both ends of the track shoe 55, and the fastening members 52 are fixedly engaged into the fastening holes 54 of the first steel plate 50a after passing through the through-holes 53 of the second rubber pad 51 and the through-holes 57 of the second steel plate 51a, so that the first and second rubber pads 50 and 51 having the undersides on which the first and second steel plates 50a and 51a are supported can be detachably mounted on the track shoe 55.

In this case, the heads of the fastening members 52 are accommodated in the through-holes 53 of the second rubber pad 51 in a depressed state, and the distal ends (i.e., referring to screw parts) of the fastening members 52 are accommodated in the mud holes 56 of the track shoe 55 so that they can be prevented from being projected to the outside.

In the meantime, the fastening holes are required to be separately formed on the track shoe 55 in order to mount the first and second rubber pads 50 and 51 to the track shoe 55.

In addition, in the case where any one of the first and second rubber pads 50 and 51 must be replaced due to its damage during the work or the travel of the excavator, the first and second rubber pads 50 and 51 are gripped by operator's hands and are pulled in opposite directions where the first and second rubber pads are far away from each other in a state in which the fastening members 52 are loosened from the fastening holes 54 of the first steel plate 50a so that the first and second rubber pads 50 and 51 can be removed from the track shoe 55. Therefore, only a relevant damaged rubber pad can be replaced with new one by checking whether or not the first and second rubber pads 50 and 51 are damaged or broken.

Figure 5:
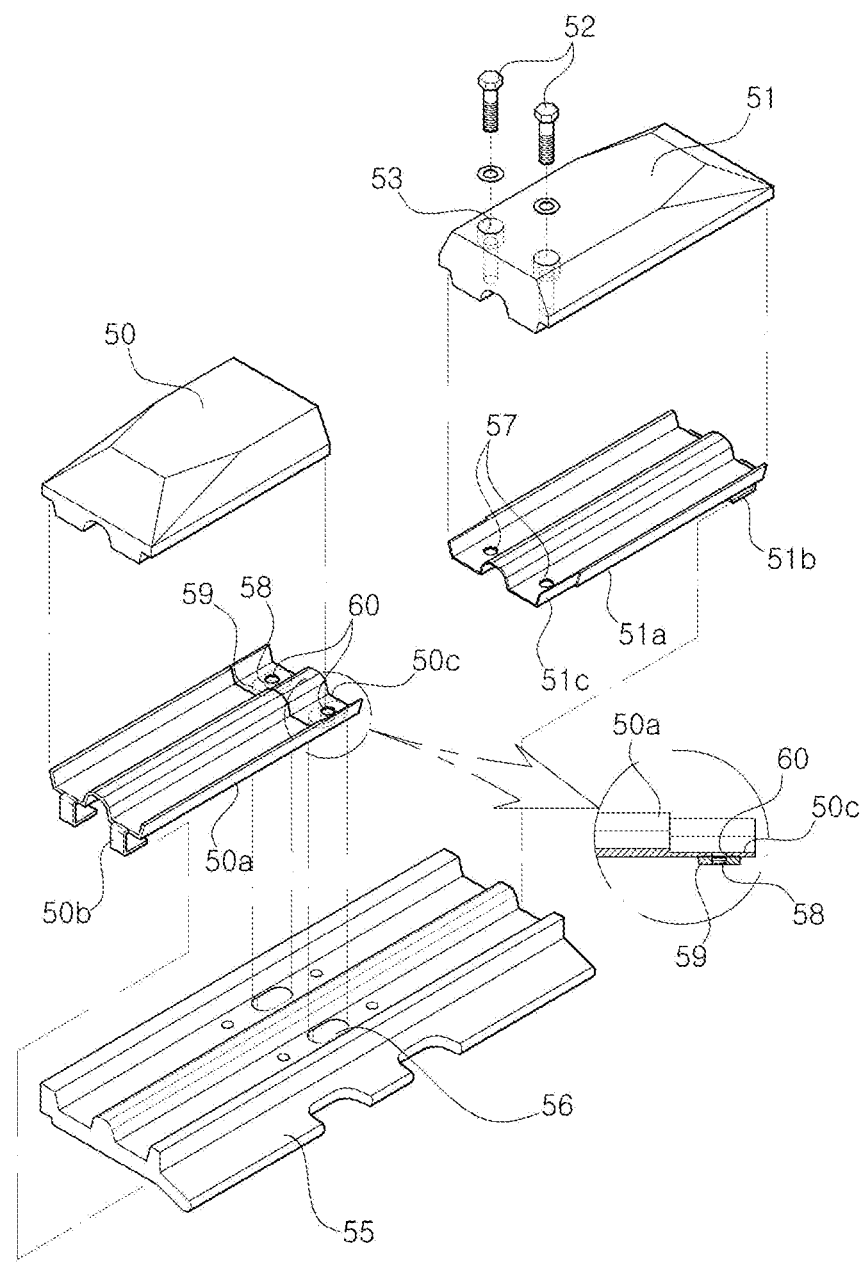
FIG. 5 is an exploded perspective view showing a lower track of a crawler type excavator in accordance with another embodiment of the present invention.

In the lower track of a crawler type excavator in accordance with another embodiment of the present invention as shown in FIG. 5, the through-holes 53, 60 and 57 are formed on the second rubber pad 51, and the joint stepped portion 50c and the joint projection portion 51c of the first and second steel plates 50a and 51a, and one or more fixing plates 59 are provided which are fixed by welding to the underside of one or more through-holes 60 of the joint stepped portion 50c, have one or more fastening holes 58 formed thereon to coincide with the through-holes 60, and are positioned in mod holes of the track shoe 55, so that the first and second rubber pads 50 and 51 are mounted on the track shoe 55 by bolts 52 which are fixedly engaged into the fastening holes 58 of the fixing plates 59 after passing through the through-holes 53 of the second rubber pad 51 and the through-holes 60 and 57 of the first and second steel plates 50a and 51a.

In this case, the configuration of the lower track of a crawler type excavator in accordance with another embodiment of the present invention as shown in FIG. 5 is the same as that of the lower track of a crawler type excavator in accordance with one embodiment of the present invention as shown in FIGS. 3 and 4, except that the through-holes 60 are formed on the joint stepped portion 50c of the first steel plate 50a, the fastening holes 58 are formed on the fixing plates 59 fixed by welding to the underside of the joint stepped portion 50c to coincide with the through-holes 60, and the through-holes 57 are formed on the joint projection portion 51c of the second steel plate 51a, so that the bolts 52 are fixedly engaged into the fastening holes 58 of the fixing plates 59 after passing through the through-holes 53 of the second rubber pad 51 and the through-holes 60 and 57 of the first and second steel plates 50a and 51a to allow the first and second rubber pads 50 and 51 to be mounted on the track shoe 55. Thus, the detailed description of the same configuration and operation thereof will be omitted to avoid redundancy, and the same elements are denoted by the same reference numerals.

While the present invention has been described in connection with the specific embodiments illustrated in the drawings, they are merely illustrative, and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should not be defined by the above-mentioned embodiments but should be defined by the appended claims and equivalents thereof.

INDUSTRIAL APPLICABILITY

As described above, according to the lower track of a crawler type excavator in accordance with an embodiment of the present invention, in the case where a rubber pad is coupled to a track shoe made of a metal material, which constitutes the lower track, a separate fastening through-hole is not required to be drilled on the track shoe.

In addition, two rubber pads dividedly formed are be detachably mounted on the track shoe, so that when the rubber pads are damaged during the work, only a relevant rubber pad can be replaced with new one, thereby enhancing the economic efficiency. Besides, the fastening members by which the rubber pad is coupled to the track shoe are prevented from being exposed to the outside, thereby avoiding damage of the fastening members due to an external impact.

The invention claimed is:

1. A lower track of a crawler type excavator, comprising:
a pair of first and second rubber pads which are dividedly formed;
a first steel plate configured to surroundingly support the underside of the first rubber pad, the first steel plate having one or more first hooks formed on the underside thereof so as to allow one end of a track shoe to be supportingly seated thereon, and a joint stepped portion having one or more fastening holes formed thereon, the joint stepped portion being formed on an opposite side of the first hook;
a second steel plate configured to surroundingly support the underside of the second rubber pad, the second steel plate having one or more second hooks formed on the underside thereof so as to allow the other end of the track shoe to be supportingly seated thereon, and a joint projection portion having one or more through-holes formed thereon to correspond to the fastening holes, the joint projection portion being formed on an opposite side of the second hook so as to be seated on the joint stepped portion; and
one or more fastening members fixedly engaged into the fastening holes of the first steel plate after passing through one or more through-holes formed in the second rubber pad and the through-holes of the second steel plate in this order,
wherein the track shoe is supported by hooking the first and second hooks on both ends of the track shoe, the first and second steel plates are assembled into a single unit by superimposing the joint projection portion of the second steel plate on the corresponding joint stepped portion of the first steel plate, and the first and second rubber pads having the undersides on which the first and second steel plates are supported are detachably mounted on the track shoe by the fastening members fixedly engaged into the fastening holes of the first steel plate after passing through the through-holes of the second rubber pad and the through-holes of the second steel plate.

2. The lower track of a crawler type excavator according to claim 1, wherein the through-holes and the fastening holes are formed on the second rubber pad, and the joint stepped portion and the joint projection portion of the first and second steel plates, so that the first and the second rubber pads are mounted on the track shoe by bolts passing through the through-holes of the second rubber pad and the fastening holes and the through-holes of the first and second steel plates and nuts fastened to the bolts and positioned in mud holes of the track shoe.

3. The lower track of a crawler type excavator according to claim 1, wherein the through-holes are formed on the second rubber pad, and the joint stepped portion and the joint projection portion of the first and second steel plates, and one or more fixing plates are provided which are fixed by welding to the underside of one or more through-holes of the joint stepped portion, have one or more fastening holes formed thereon to coincide with the through-holes, and are positioned in mod holes of the track shoe, so that the first and second rubber pads are mounted on the track shoe by bolts which are fixedly engaged into the fastening holes of the fixing plates after passing through the through-holes of the second rubber pad and the through-holes of the first and second steel plates.

* * * * *